Patented Jan. 9, 1951

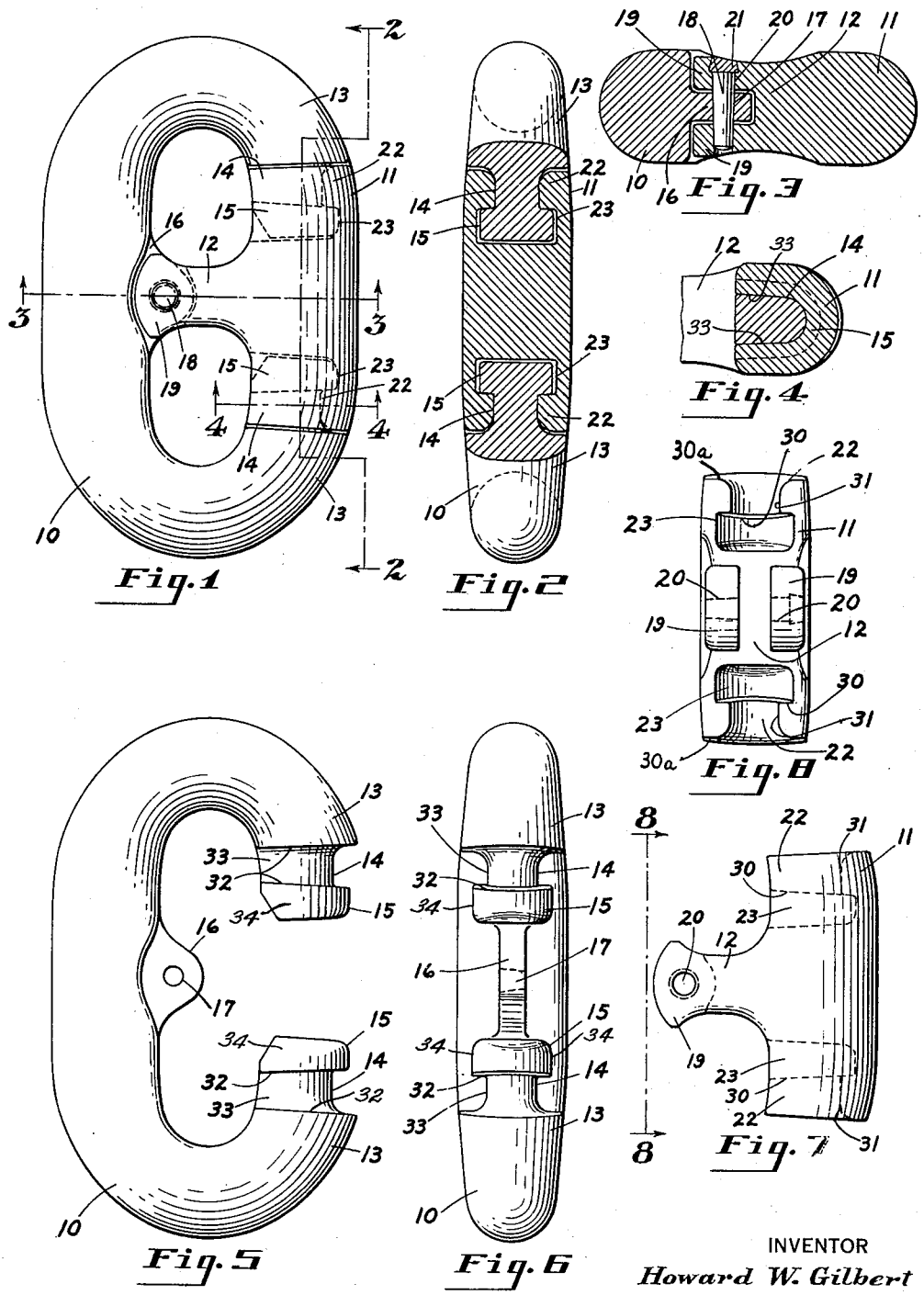

2,537,405

UNITED STATES PATENT OFFICE 2,537,405

CHAIN LINK

Howard W. Gilbert, Shaker Heights, Ohio, assignor to National Malleable and Steel Castings Company, Cleveland, Ohio, a corporation of Ohio Application July 16, 1945, Serial No. 605,327

1 Claim. (Cl. 59—85)

This invention relates to chain links and, more particularly, to stud chain joining links.

An object of this invention is to join effectively two lengths of chain by a stud chain joining link, which may be readily applied.

Another object of this invention is to provide a stud chain joining link which can be quickly attached to two links of chain, which holds the links firmly together without danger of breaking, and which can be manufactured economically.

Anchor chains are ordinarily manufactured in lengths of fifteen fathoms or ninety feet, known as shots. To join one or more shots into a cable for use on ships or to replace a defective or broken link in a chain, joining links are employed. These joining links must be sufficiently strong to withstand the severe use to which the cable is subjected and are preferably so constructed that they can be relatively easily joined together and taken apart.

In accordance with this invention, a stud chain joining link is provided which is capable of withstanding the severe use to which the cable is subjected, which can be readily attached to the terminal links of lengths of chain to be joined together and which can be manufactured economically. The stud chain joining link of this invention can be disassembled quickly and for this reason is particularly adapted for use in connecting a cable of chain to an anchor.

The stud chain joining link of this invention may be more fully understood by reference to the accompanying drawing, in which Fig. 1 is a plan view of the embodiment of the stud chain joining link of this invention.

Fig. 2 is a side elevation, partly in section, of the link shown in Fig. 1 along the line 2—2 thereof.

Fig. 3 is a transverse cross-sectional view of the link shown in Fig. 1 along the lines 3—3 thereof.

Fig. 4 is a transverse cross-sectional view of the link shown in Fig. 1 along the line 4—4 thereof.

Figs. 5 and 6 are a plan view and side elevation, respectively, of the main or C portion of the link shown in Fig. 1.

Fig. 7 is a plan view of the detachable or T portion of the link shown in Fig. 1, and Fig. 8 is a side elevation of the detachable or T portion of the link shown in Fig. 7 as viewed along the line 8—8 thereof.

Referring to the drawing in which like numerals indicate like parts, the numeral 10 is the main or C portion of the link. A detachable or T portion 11, which includes a stud 12, is adapted for insertion into the C portion or member 10 to form a stud joining link. The C-shaped member 10 terminates in similarly shaped arms 13, each of which has a groove or recession 14 (the sides 32 of which converge and the bottom surfaces 33 of which diverge toward the center of the member). Immediately adjacent to each groove 14 is a lug or projection 15 (the outer sides 34 of which diverge toward the center of the member in the same manner as the bottom surfaces 33 of groove 14). A projection or tongue 16, having a tapered aperture 17 on the C-shaped member 10 secures the detachable member 11 to the member 10 by means of a tapered retaining pin 18. Two lugs 19 on the member 11 are adapted to be adjacent the tongue 16 when the parts are assembled. Tapered apertures 20 in the lugs 19 aline with the tapered aperture 17 on the tongue 16 to accommodate the tapered retaining pin 18 and hold securely together the T-shaped member 11 and C-shaped member 10. An end of one of the tapered apertures 20 is counterbored with an outward taper for the insertion of a soft metal plug 21. The plug 21, while shown in Fig. 3, is not shown in Fig. 1.

The T-shaped member 11 has a lug or projection 22 and a groove or recession 23 adapted and tapered, respectively, for engaging the groove 14 and the lug 15 of member 10. The inner surface 30 and outer surface 30a of lug 22 converge in the direction of stud 19 and the sides of surface 31 of lug 22 diverge in the direction of stud 19. The sides and bottom of groove 23 diverge in the direction of stud 19. The lug 22, with its corresponding groove or recession 14, and the groove 23 with its corresponding lug 15 are constructed and arranged as shown in Fig. 2, so that a relatively tight fit exists between the area of innermost recess of the groove 14 and shoulders adjacent the lug 15 and its associated surface on the lug 22, and clearance is provided between the other associated surfaces of the lugs 22 and 15 and the grooves 14 and 23.

It is preferred to have the stud link of a size substantially the same as that of the common links to be joined together by the joining link of this invention, and it is essential that such joining links have approximately the same strength as that of the links to be joined together.

In order to obtain the necessary strength it is essential to have a very accurate fit between the pulling surfaces on the C and T shaped members. To manufacture the stud chain joining link to obtain such a fit, both the C-shaped member 10 and the T-shaped member 11 are first cast or forged. In this preliminary casting or forging operation it is virtually impossible to secure the desired close engagement of the pulling surfaces.

Therefore, after casting, the T-shaped member 11 is reheated to a temperature at which it can be readily forced into the arms 13 of the C-shaped member. A temperature between 1000 and 1250° F. has been found satisfactory to assure sufficient plasticity of the metal to allow it to flow. As a result of this operation, and due to the construction of the tapered surfaces on the associated lugs and recesses, the metal will flow to permit the pulling surfaces on the T-shaped member to accommodate themselves to the contour of the pulling surfaces of the C-shaped member. To correct any tendency for lugs 22 to spread, the resulting joined stud link may be placed horizontally between two flat dies and pressed together. While it is convenient to press the entire assembled link, it is only essential to press the portion over the interlocking members. This pressing insures a tight fit between the pulling surfaces together with the surfaces substantially perpendicular thereto of the recessions and projections of the T-shaped member and their corresponding contacting surfaces on the C-shaped member. Alternatively, instead of heating the T-shaped member, the C-shaped member may be heated and the T-shaped member forced between the arms 13 of the C-shaped member while the C-shaped member is heated. Or again, both the C-shaped and T-shaped member may be heated.

By the manufacture of stud links by this process, the machining of the contacting surfaces is eliminated and substantially no internal strains are set up in the resulting stud link. The stud link is then heat treated in the conventional manner with the two parts assembled. By insuring a close fit between the pulling surfaces and the surfaces substantially perpendicular thereto in the jointure of the T-shaped member and the C-shaped member, maximum strength in the resulting link is afforded. If a loose fit exists between those surfaces, abnormal bending stresses are set up in the resulting link.

To connect the terminal links of two lengths of chain the C-shaped member 10 is threaded through the free eye of a terminal link of the two lengths of chains to be joined or an end of a cable and an anchor. These terminal links and the C-shaped member 10 are drawn out longitudinally, and the T-shaped member 11 is inserted through the open arms 13 of the C-shaped member to join the T-shaped member 11 with the C-shaped member 10. When the apertures 17 and 20 are alined, the pin 18 is inserted and, if desired, the soft metal plug 21 is inserted to retain the pin 18 in position. While in the specific embodiment illustrated, the eyes of the stud chain joining link are identical, they may be different sizes. For example, in a stud chain joining link in accordance with this invention which is adapted for joining a chain cable with an anchor, one of the eyes is substantially the same as that illustrated, while the other eye is somewhat larger to accommodate the shackle of the anchor.

The terms and expressions which are employed herein are used as terms of description and not of limitation, and there is no intention, in the use of such terms and expressions, of excluding any mechanical equivalents of the features shown and described or portions thereof, but it is recognized that various structural modifications are possible within the scope of the invention claimed.

What is claimed is:

A stud joining link comprising a C-shaped member terminating in a pair of spaced arms, each arm having a transversely extending C-shaped groove near the end thereof, each of said grooves having a side surface nearest the end of each arm disposed so as to diverge with respect to the corresponding side surface of the other groove in a direction inwardly of said member, and a T-shaped member for insertion between said arms to form a complete stud link with said C-shaped member, the longitudinally extending portion of said T-shaped member having a C-shaped recess at each end thereof for receiving the end of one of said arms, each recess in said T-shaped member having a C-shaped pulling shoulder which diverges with respect to the corresponding shoulder of the other recess in said T-shaped member in a direction inwardly of the link, said shoulders being adapted for tight engagement with said side surfaces in said C-shaped member upon application of said T-shaped member to said C-shaped member, and means for securing said members together, said means comprising a pair of spaced lugs on one of said members and a tongue on the other of said members adapted to extend between said lugs, said lugs and tongue having an aligned opening disposed inwardly of the side of the main body portion of said C-shaped member, and pin means received in said opening.

HOWARD W. GILBERT.

REFERENCES CITED

The following references are of record in the file of this patent:

UNITED STATES PATENTS

| Number | Name | Date |
|--------|------|------|
| 1,065,564 | Tobin | June 24, 1913 |
| 1,614,900 | Ryan | Jan. 18, 1927 |
| 2,382,344 | St. Pierre | Aug. 14, 1945 |
| 2,398,897 | H. St. Pierre | Apr. 23, 1946 |